US010642121B2

(12) United States Patent
Kwon et al.

(10) Patent No.: US 10,642,121 B2
(45) Date of Patent: May 5, 2020

(54) REFLECTIVE DISPLAY DEVICE FOR VISIBLE LIGHT AND INFRARED CAMOUFLAGE AND ACTIVE CAMOUFLAGE DEVICE USING THE SAME

(71) Applicant: KOREA ELECTRONICS TECHNOLOGY INSTITUTE, Seongnam-si, Gyeonggi-do (KR)

(72) Inventors: Soon Hyung Kwon, Seongnam-si (KR); Won Keun Kim, Seongnam-si (KR)

(73) Assignee: KOREA ELECTRONICS TECHNOLOGY INSTITUTE, Seongnam-si, Gyeonggi-do (KR)

( * ) Notice: Subject to any disclaimer, the term of this patent is extended or adjusted under 35 U.S.C. 154(b) by 0 days.

(21) Appl. No.: 15/909,561

(22) Filed: Mar. 1, 2018

(65) Prior Publication Data
US 2018/0267382 A1    Sep. 20, 2018

(30) Foreign Application Priority Data

Mar. 2, 2017   (KR) .................. 10-2017-0027270
Apr. 28, 2017  (KR) .................. 10-2017-0055285

(51) Int. Cl.
*G02F 1/167*   (2019.01)
*H04N 5/33*    (2006.01)
(Continued)

(52) U.S. Cl.
CPC .............. *G02F 1/167* (2013.01); *F41H 3/00* (2013.01); *F41H 3/02* (2013.01); *G02F 1/1677* (2019.01);
(Continued)

(58) Field of Classification Search
CPC ... G02F 1/167; G02F 2001/676; H04N 5/332; F41H 3/00
See application file for complete search history.

(56) References Cited

U.S. PATENT DOCUMENTS 6,127,022 A  * 10/2000 Pretorius .................. F41H 3/00
                                                       428/17
8,340,358 B2 † 12/2012 Cincotti
(Continued)

FOREIGN PATENT DOCUMENTS

JP    2002-277904 A    9/2002
JP    2006-184313 A    7/2006
(Continued)

OTHER PUBLICATIONS

Korean Office Action dated Jul. 20, 2018 in connection with the counterpart Korean Patent Application No. 10-2017-0055285.
(Continued)

*Primary Examiner* — Shawn S An
(74) *Attorney, Agent, or Firm* — Hauptman Ham, LLP

(57) ABSTRACT

Disclosed is a reflective display device for visible light and infrared camouflage and an active camouflage device using the same, the reflective display device including: an upper substrate formed of a transparent material; an upper electrode layer formed of a transparent material provided under the upper substrate; at least one unit cell provided under the upper electrode layer, the unit cell containing a fluid and multiple particles being charged with opposite polarities and having different quantities of electric charge or different sizes; a lower electrode layer provided under the unit cell, the lower electrode layer for generating an electric field in conjunction with the upper electrode layer and defining a pixel area; a metal layer provided under the lower electrode
(Continued)

US 10,642,121 B2
Page 2 layer, the metal layer blocking thermal-infrared rays; and a lower substrate provided under the metal layer.

10 Claims, 11 Drawing Sheets

(51) Int. Cl.

| | | |
|---|---|---|
| F41H 3/00 | (2006.01) | |
| F41H 3/02 | (2006.01) | |
| G09G 3/34 | (2006.01) | |
| G09G 3/00 | (2006.01) | |
| G02F 1/1677 | (2019.01) | |
| G02F 1/1676 | (2019.01) | |
| H04N 7/18 | (2006.01) | |
| G02F 1/16757 | (2019.01) | |

(52) U.S. Cl.
CPC ............ *G09G 3/00* (2013.01); *G09G 3/344* (2013.01); *H04N 5/332* (2013.01); *G02F 1/1676* (2019.01); *G02F 1/16757* (2019.01); *G09G 2300/08* (2013.01); *H04N 7/185* (2013.01)

(56) References Cited

U.S. PATENT DOCUMENTS

| | | | | |
|---|---|---|---|---|
| 8,797,635 | B2† | 8/2014 | Yeh | |
| 8,803,157 | B2* | 8/2014 | Hsu | G02F 1/167 257/72 |
| 8,867,119 | B2† | 10/2014 | Hwang | |
| 9,175,930 | B1† | 11/2015 | Pezeshkian | |
| 2004/0213982 | A1* | 10/2004 | Touzov | F41H 3/00 428/304.4 |
| 2005/0000564 | A1* | 1/2005 | Sato | C23C 16/0272 136/256 |
| 2006/0043517 | A1* | 3/2006 | Sasaki | H01L 31/076 257/458 |
| 2008/0174531 | A1* | 7/2008 | Sah | G09G 3/2003 345/84 |
| 2009/0161051 | A1* | 6/2009 | Fukunaga | G06F 3/0412 349/115 |
| 2010/0243058 | A1* | 9/2010 | Meguro | H01L 31/02168 136/261 |
| 2012/0036733 | A1* | 2/2012 | Dehn | A61F 13/00008 34/282 |
| 2012/0307343 | A1* | 12/2012 | Lai | G02F 1/167 359/296 |
| 2015/0377578 | A1* | 12/2015 | Tucker | F41A 23/18 248/309.4 |
| 2016/0003989 | A1* | 1/2016 | Watanabe | G02B 5/26 359/359 |
| 2017/0103709 | A1† | 4/2017 | Lin | |
| 2017/0352290 | A1* | 12/2017 | Sasaki | A61B 5/01 |
| 2018/0210309 | A1* | 7/2018 | Liu | G02F 1/167 |

FOREIGN PATENT DOCUMENTS

| | | |
|---|---|---|
| KR | 10-0570874 B1 | 4/2006 |
| KR | 10-2011-0116214 A | 10/2011 |
| KR | 10-2013-0087001 A | 8/2013 |
| KR | 10-2016-0000378 A | 1/2016 |
| KR | 10-2017-0000626 A | 1/2017 |

OTHER PUBLICATIONS

Masayuki Nishii, "The Use of Transparent Conductive Polymer for Electrode Materials in Flexible Electronic Paper", pp. 768-71, Jun. 2009, SID 09 Digest (vol. 40, Issue 1).†

* cited by examiner
† cited by third party

REFLECTIVE DISPLAY DEVICE FOR VISIBLE LIGHT AND INFRARED CAMOUFLAGE AND ACTIVE CAMOUFLAGE DEVICE USING THE SAME

CROSS REFERENCE TO RELATED APPLICATION

The present application claims priority to Korean Patent Application Nos. 10-2017-0027270, filed Mar. 2, 2017, and 10-2017-0055285, filed Apr. 28, 2017, the entire contents of which is incorporated herein for all purposes by this reference.

BACKGROUND OF THE INVENTION

Field of the Invention

The present invention relates generally to a reflective display device for visible light and infrared camouflage, and an active camouflage device using the same.

Description of the Related Art

Military equipment needs to be concealed from enemies in a remote distance. Particularly, since ground combat vehicles, such as a tank, are more likely to be first offense targets of fighters, it is required to camouflage the ground combat vehicles to avoid being distinguished from the surrounding environment.

Recently, the military has increased camouflage of military equipment by forming camouflage patterns, such as blotches, rather than a single color. However, though the camouflage pattern painted with particular colors or patterns is excellent in certain circumstances, it may easily be exposed to the enemy when the surrounding environment changes due to movement of the vehicle. Also, even though the vehicle is camouflaged in a visible light region, there is a risk of being exposed to the enemy by night-time observation equipment that can observe a near-infrared region and a thermal-infrared region.

Therefore, it is necessary to camouflage military equipment in the visible light region as well as the infrared region. Also, seasonal changes in domestic scenery are obvious and a surrounding environment differ seasonally, and thus it is required that military equipment has actively changing camouflage patterns based on the surrounding environment rather than a fixed camouflage pattern.

The foregoing is intended merely to aid in the understanding of the background of the present invention, and is not intended to mean that the present invention falls within the purview of the related art that is already known to those skilled in the art.

DOCUMENT OF RELATED ART (Patent Document 1) Korean Patent Application Publication No. 10-2016-0000378.

SUMMARY OF THE INVENTION

Accordingly, the present invention has been made keeping in mind the above problems occurring in the related art, and the present invention is intended to propose a reflective display device for visible light and infrared camouflage, the device including a fluid, a unit cell containing particles having different quantities of electric charge or different sizes, and a shielding layer formed of a material, such as a metal absorbing thermal-infrared rays, the unit cell itself representing various colors depending on strength and direction of electric field applied to the unit cell.

Also, the present invention is intended to propose a reflective display device for visible light and infrared camouflage, the device including particles containing pigment reflecting or absorbing near-infrared rays so as to adjust reflectance of near-infrared rays depending on electric field applied to the unit cell.

Also, the present invention is intended to propose an active camouflage device that analyzes a surrounding environment of a visible light region and an infrared region and forms and displays a visible light or infrared camouflage pattern based on a surrounding environment in real time using the reflective display device for visible light and infrared camouflage.

In order to achieve the above object, according to an embodiment of the present invention, there is provided a reflective display device for visible light and infrared camouflage, the reflective display device including: an upper substrate formed of a transparent material; an upper electrode layer formed of a transparent material provided under a lower surface of the upper substrate; at least one unit cell provided under a lower surface of the upper electrode layer, the unit cell containing a fluid and multiple particles being charged with opposite polarities and having different quantities of electric charge or different sizes; a lower electrode layer provided under the unit cell, the lower electrode layer for generating an electric field in conjunction with the upper electrode layer to control the unit cell included in a pixel area; a shielding layer provided under a lower surface of the lower electrode layer, the shielding layer blocking thermal-infrared rays; and a lower substrate provided under a lower surface of the shielding layer.

Also, the upper electrode layer may include a plurality of upper electrodes arranged parallel to each other in a first direction, the lower electrode layer may include a plurality of lower electrodes arranged parallel to each other in a second direction perpendicular to the first direction, and the upper electrode layer and the lower electrode layer may control the pixel area in a passive matrix (PM) manner.

Also, the lower electrode layer may include a thin film transistor for controlling each pixel area, and the upper electrode layer and the lower electrode layer may control the pixel area in an active matrix (AM) manner.

Also, the lower electrode layer may include lower electrodes positioned at each pixel area, and each of the lower electrodes may control the pixel area in a segment manner.

Also, the multiple particles may include pigments reflecting or absorbing near-infrared rays and may move to an upper portion or a lower portion of the unit cell by the electric field, such that near-infrared reflectance of the unit cell observed from outside is adjusted.

Also, the shielding layer may contain at least one of platinum (Pt), gold (Au), silver (Ag), aluminium (Al), iron (Fe), copper (Cu), tin oxide, indium tin oxide (ITO), antimony tin oxide (ATO), $Al_2O_3$, ZnO, $TiO_2$, and indium gallium zinc oxide (IGZO) that block thermal-infrared rays.

Also, the fluid and the multiple particles may be provided in at least two colors selected from a group of military beige gray, military forest green, military olive green, military chocolate, and military charcoal.

Also, the upper substrate may be formed of a material having transmittance of 80% or more in a wavelength range of 600 to 860 nm.

Also, the unit cell may include a first particle having a pigment absorbing near-infrared rays and a second particle having a pigment reflecting near-infrared rays.

According to an embodiment of the present invention, there is provided an active camouflage device including: a display unit composed of multiple reflective display devices for visible light and infrared camouflage, the display unit surrounding an exterior of a combat vehicle; a camera unit photographing a surrounding environment of the combat vehicle in every direction to obtain a visible light image and an infrared image; and an image controller forming a visible light camouflage pattern based on the visible light image or an infrared camouflage pattern based on the infrared image so as to display the formed pattern on the display unit.

Also, the image controller may include: an image analysis module analyzing the visible light image to extract a plurality of representative colors, analyzing distributions, and analyzing the infrared image to calculate infrared reflectance; a pattern forming module, based on the representative colors and the distribution, forming the visible light camouflage pattern to be displayed on the display unit and, based on the infrared reflectance, forming the infrared camouflage pattern to be displayed on the display unit; and an operating module controlling the display unit to enable the visible light camouflage pattern or the infrared camouflage pattern formed by the pattern forming module to be displayed on the display unit.

Also, the active camouflage device may further include a pattern database storing preset visible light camouflage patterns and preset infrared camouflage patterns, wherein the pattern forming module compares the representative colors, the distributions, and the infrared reflectance with the preset patterns stored in the pattern database to select a similar camouflage pattern.

The features and advantages of the present invention will be more clearly understood from the following detailed description when taken in conjunction with the accompanying drawings.

All terms or words used herein should not be interpreted as being limited merely to common and dictionary meanings but should be interpreted as having meanings and concepts which are defined within the technical scope of the present invention.

In the reflective display device for visible light and infrared camouflage according to an embodiment of the present invention, the unit cell contains the fluid and particles being charged with opposite polarities and having different quantities of electric charge or different sizes, and the unit cell itself can represent various colors depending on the strength and direction of electric field with high color reproducibility. Also, the reflective display device includes the shielding layer formed of a material, such as a meter absorbing thermal-infrared rays, etc., such that the combat vehicle can be hidden from equipment detecting thermal-infrared regions.

Also, the particles contain pigments reflecting or absorbing near-infrared rays, and reflectance of near-infrared rays is adjusted depending on strength of electric field applied to the unit cell to have similar reflectance to near-infrared reflectance of a surrounding environment, whereby the combat vehicle can be hidden from equipment detecting a near-infrared region.

Also, according to an embodiment of the present invention, the active camouflage device can analyze a surrounding environment of the visible light region and infrared region, and can form and display the visible light or infrared camouflage pattern based on the surrounding environment using the reflective display device for visible light and infrared camouflage in real time, whereby the combat vehicle can be adapted to the surrounding environment in real time and effective camouflage is ensured.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
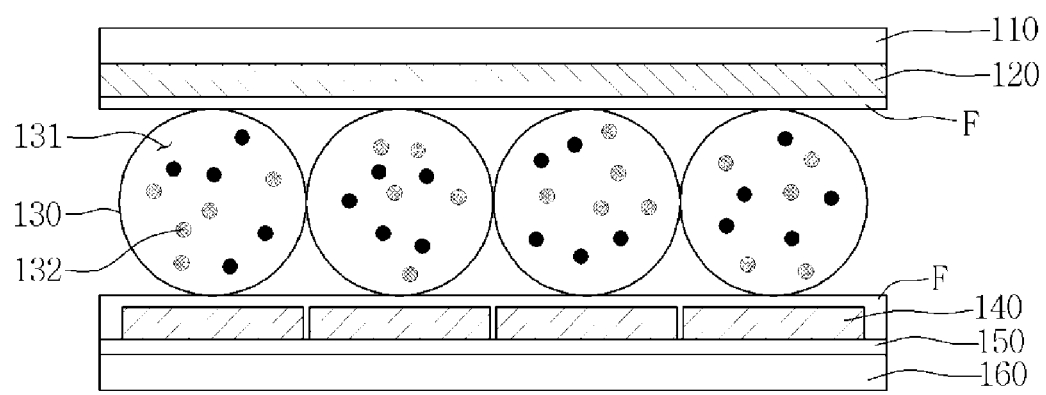
FIG. 1 is a cross-sectional view illustrating a reflective display device for visible light and infrared camouflage according to an embodiment of the present invention.

The above and other objects, features and other advantages of the present invention will be more clearly understood from the following detailed description when taken in conjunction with the accompanying drawings. As for reference numerals associated with parts in the drawings, the same reference numerals will refer to the same or like parts through the drawings. It will be understood that, although the terms "first", "second", "first end", "second end", etc. may be used herein to describe various elements, these elements should not be limited by these terms. These terms are only used to distinguish one element from another element. Particularly, for convenience of explanation, the terms "upper", "lower", etc. indicating directions are used in the present invention. In this case, "upper" indicates a direction where a reflective display device for visible light and infrared camouflage is visible to outside, and "lower" indicates a direction which is invisible to outside, which is a relative concept. Also, "a reflective display device for visible light and infrared camouflage" may be simply referred to as "a reflective display device" or "a display device", and "an active camouflage device" may be referred to as "a camouflage device". When it is determined that the detailed description of the known art related to the present invention might obscure the gist of the present invention, the detailed description thereof will be omitted.

Hereinafter, an embodiment of the present invention will be described in detail with reference to the accompanying drawings.

FIG. 1 is a cross-sectional view illustrating a reflective display device for visible light and infrared camouflage according to an embodiment of the present invention.

As shown in FIG. 1, according to the embodiment of the present invention, the reflective display device 100 for visible light and infrared camouflage includes: an upper substrate 110 formed of a transparent material; an upper electrode layer 120 formed of a transparent material provided under a lower surface of the upper substrate 110; at least one unit cell 130 provided under a lower surface of the upper electrode layer 120, the unit cell 130 containing a fluid 131 and multiple particles 132 being charged with opposite polarities and having different quantities of electric charge; a lower electrode layer 140 provided under the unit cell 130, the lower electrode layer 140 for generating an electric field in conjunction with the upper electrode layer 120 to control the unit cell 130 included in a pixel area; a shielding layer 150 provided under a lower surface of the lower electrode layer 140, the shielding layer 150 blocking thermal-infrared rays; and a lower substrate 160 provided under a lower surface of the shielding layer 150.

The upper substrate 110 and the lower substrate 160 are formed of a flexible material such that military equipment, e.g. a combat vehicle, etc., can be covered with the display device 100. The lower substrate 160 is invisible from outside of the display device 100, and thus the lower substrate 160 may or may not be transparent. However, the upper substrate 110 is visible from outside, and thus the upper substrate 110 is formed of a transparent material such that light from outside can be reflected on the unit cell 130 and displayed to outside.

Figure 2:
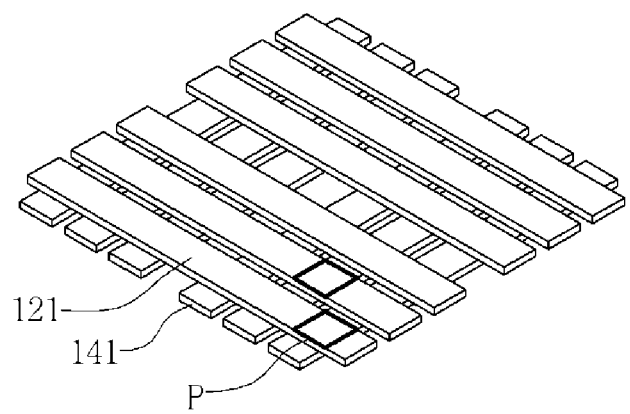
FIG. 2 is a view illustrating an upper electrode and a lower electrode of FIG. 1.
Figure 3:
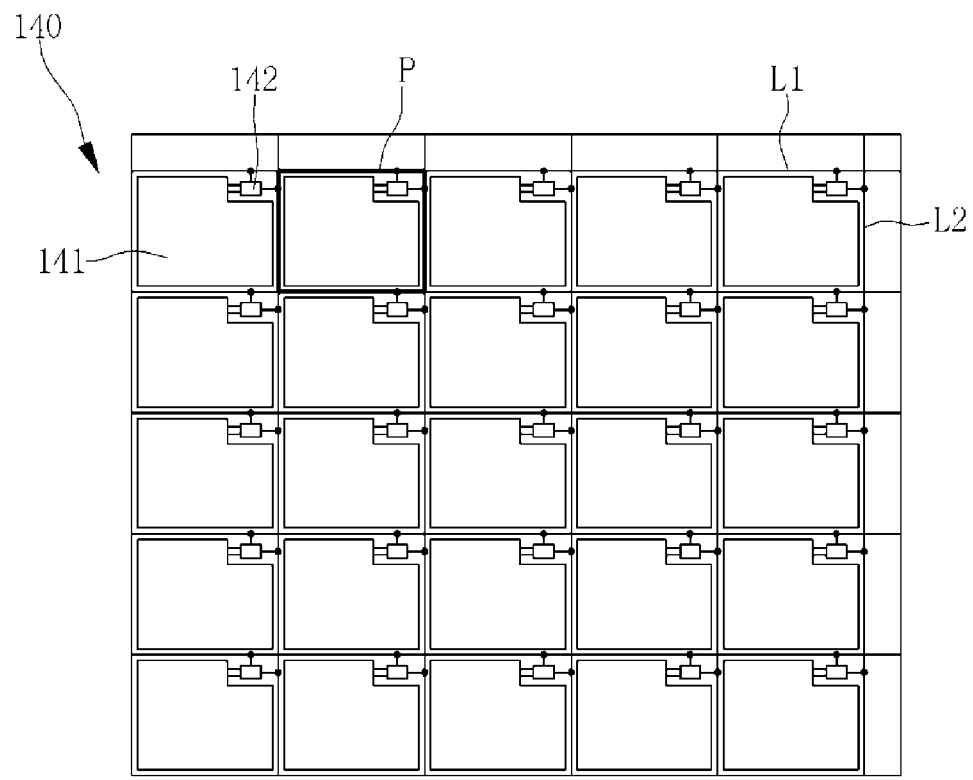
FIG. 3 is a view illustrating the lower electrode of FIG. 1.
Figure 4:
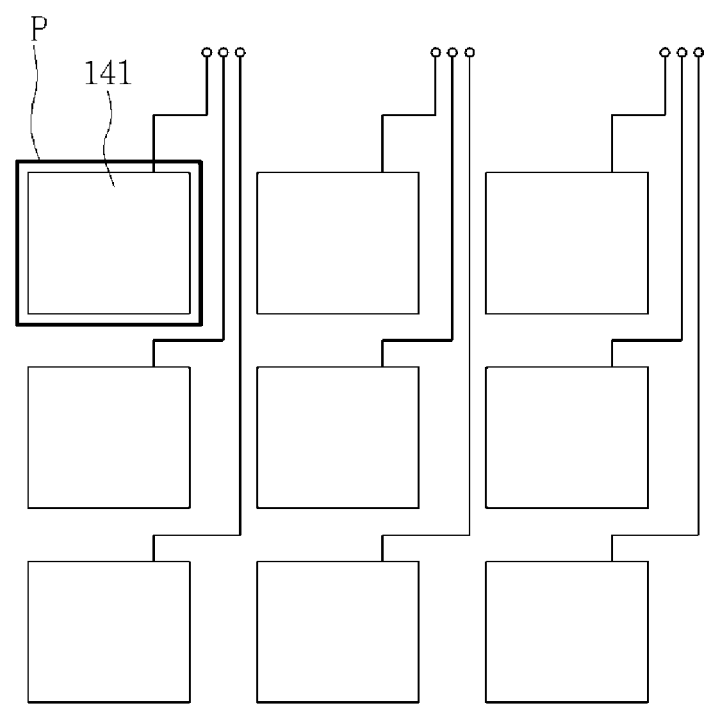
FIG. 4 is a view illustrating another example of the lower electrode of FIG. 1.

FIG. 2 is a view illustrating the upper electrode layer 120 and the lower electrode layer 140 of FIG. 1. FIG. 3 is a view illustrating the lower electrode layer 140 of FIG. 1. FIG. 4 is a view illustrating another example of the lower electrode of FIG. 1.

The upper electrode layer 120 and the lower electrode layer 140 apply an electric field to the unit cell 130 so as to control the color of the unit cell 130. The upper electrode layer 120 is provided under the upper substrate 110, and the lower electrode layer 140 is provided to face the upper electrode layer 120 with the unit cell 130 intervening therebetween. The upper electrode layer 120 includes a plurality of upper electrodes 121, and the lower electrode layer 140 includes a plurality of lower electrodes 141. A portion where the upper electrode 121 and the lower electrode 141 are vertically overlapped is a pixel area (P in FIGS. 1 to 3), and the pixel area P may include at least one unit cell 130. The lower electrode 141 and the upper electrode 121 are formed of a flexible material. The lower electrode 141 is an invisible portion, and thus the lower electrode 141 may or may not be transparent. However, the upper electrode 121 is formed of a transparent material such that the color of the unit cell 130 can be exposed to outside. The upper electrode layer 120 and the lower electrode layer 140 may be configured and operated in a passive matrix (PM) manner, an active matrix (AM) manner, or a segment manner.

As shown in FIG. 2, in the case of the PM manner, the upper electrode layer 120 includes a plurality of upper electrodes 121 arranged parallel to each other in a first direction, and the lower electrode layer 140 includes a plurality of lower electrodes 141 arranged parallel to each other in a second direction perpendicular to the first direction. The upper electrode layer 120 and the lower electrode layer 140 control the pixel areas in the PM manner.

As shown in FIG. 2, the first direction in which the upper electrodes 121 are arranged is perpendicular to the second direction in which the lower electrodes 141 are arranged. An intersection of the upper electrode 121 and the lower electrode 141 is defined as one pixel area P, and a plurality of pixel areas P are defined in the display device 100. A voltage applied to the upper electrode 121 and the lower electrode 141 that define the pixel area P is adjusted to control the color of the unit cell 130.

As shown in FIG. 3, in the case of the AM manner, the lower electrode layer 140 includes switches 142, such as a thin film transistor, etc. for controlling each pixel area, such that the upper electrode layer 120 and the lower electrode layer 140 may control the pixel areas in the AM manner. The lower electrode layer 140 includes each lower electrode 141 corresponding to the pixel area P coupled to a switch 142 and a capacitor (not shown), and a first line L1 and a second line L2 controlling on/off of the switch 142.

As shown in FIG. 4, in the case of the segment manner, the upper electrode layer 120 includes a single common electrode, and the lower electrode layer 140 includes a plurality of lower electrodes 141 separated from each other. Unlike the PM or AM manner, each lower electrode 141 is not electrically signally coupled to the adjacent lower electrode 141, and each lower electrode is independently controlled. Thus, an electric position of each lower electrode 141 for the upper electrode 121 is individually controlled so as to control the pixel areas P. The PM manner, the AM manner, or the segment manner may be applied to the reflective display device 100 for visible light and infrared camouflage according to the embodiment of the present invention.

In the meantime, the upper substrate 110 and the lower substrate 160 are provided with protective films F covering the upper electrode layer 120 and the lower electrode layer 140, such that a space where the unit cell 130 is disposed may be formed even. The protective film F may contain an insulative material, such that it is possible to prevent the unit cell 130 from being directly in contact with the lower electrode or the upper electrode.

The shielding layer 150 blocking thermal-infrared rays is provided between the lower substrate 160 and the lower electrode layer 140. Thermal-infrared rays cover wavelength ranges of a mid-wavelength infrared (MIR) region with a wavelength of 3 to 5 μm and a far infrared (FIR) region with a wavelength of 8 to 14 μm.

The shielding layer 150 is formed of a material blocking thermal-infrared rays. For example, a metal, such as platinum (Pt), gold (Au), silver (Ag), aluminium (Al), iron (Fe), copper (Cu), etc., and metal oxides, such as tin oxide, indium tin oxide (ITO), antimony tin oxide (ATO), $Al_2O_3$, ZnO, $TiO_2$, indium gallium zinc oxide (IGZO), etc. are used as the material of the shielding layer 150.

The shielding layer 150 may be provided as a planar layer formed on the lower substrate 160 in the manner of coating, plating, deposition, etc. Alternatively, the shielding layer 150 may be formed in a mesh form having spacing less than the wavelength of thermal-infrared rays. The mesh form enables the weight of the shielding layer 150 to be reduced, such that the weight of the display device 100 can be reduced.

The shielding layer 150 is provided between the lower substrate 160 and the lower electrode layer 140, such that it is possible to prevent thermal-infrared rays from being radiated from the lower portion of the display device 100 to the upper portion of the display device 100. Thus, the display device 100 can be hidden from observation equipment that detects a thermal-infrared ray region at night.

Figure 5A:
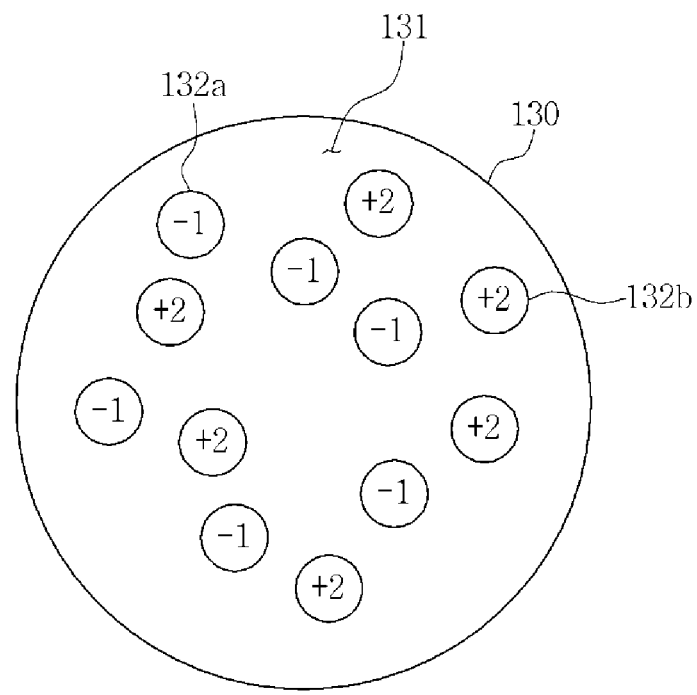
FIGS. 5A and 5B are views illustrating particle configuration of a unit cell of FIG. 1.
Figure 5B:
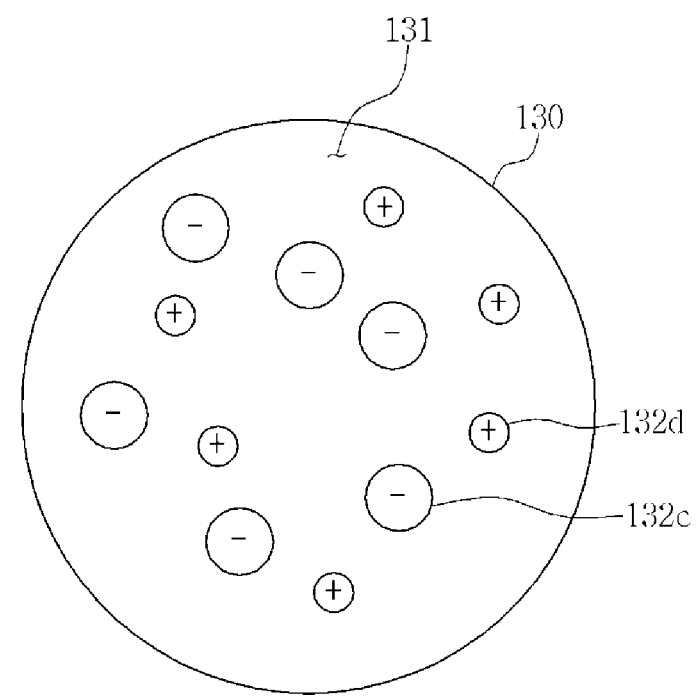

FIGS. 5A and 5B are views illustrating particle configuration of the unit cell of FIG. 1.

As shown in FIG. 1, the unit cell 130 is provided between the upper electrode layer 120 and the lower electrode layer 140. As shown in FIG. 5A, the unit cell 130 may contain the fluid 131 and the multiple particles 132 being charged with opposite polarities and having different quantities of electric charge. As shown in FIG. 5B, the unit cell 130 may contain the fluid 131 and the multiple particles 132 being charged with opposite polarities and having different sizes. At least one unit cell 130 is disposed for each pixel area P defined as the intersection of the upper electrode 121 and the lower electrode 141.

As shown in FIGS. 1, 5A, and 5B, the unit cell 130 may be formed in the form of an individual capsule surrounding the fluid 131 and the particles 132, and a plurality of capsules may be disposed between the upper electrode layer 120 and the lower electrode layer 140. Alternatively, the unit cells 130 may be formed in the form of a layer obtained by forming a plurality of partitions on the bottom surface and injecting the fluid 131 and the particles 132 between the partitions and covering the top surface, whereby a plurality of unit cells 130 can be simultaneously formed. Forming of the unit cell 130 is not limited thereto, and the unit cell 130 may be formed in various methods and forms, such as a micro-cup, etc.

The unit cell 130 may contain the fluid 131 that is electrically neutral and fills the inside of the unit cell as well as the multiple particles 132 having negative or positive polarities and various quantities of electric charge in the fluid 131 or the multiple particles 132 having negative or positive polarities, the same quantity of electric charge, and different sizes in the fluid 131. The fluid 131 and the particles 132 may have the same color or different colors. The particles 132 may have the same color or different colors.

For example, when the fluid 131 has a first color and the multiple particles 132 have second and third colors, one unit cell 130 may display the first color, the second color, the third color, or a combination thereof. In this structure, one unit cell 130 can operate as a single pixel, and color reproducibility is high since the fluid 131 and the particles 132 represent the target color itself without representing the color by combining basic colors, such as RGB, etc.

The colors of the fluid 131 and the particles 132 may be configured by selecting at least one of colors described in the following table.

TABLE

| Idiomatic color name | Systematic color name | Munsell value | English name |
|---|---|---|---|
| Military beige gray | Grayish brown | 7.5 YR 5/2 | Land |
| Military forest green | Dark greenish gray | 10 Y 3/1 | Forest green |
| Military olive green | Dark grayish green | 10 Y 3/2 | Dark olive green |
| Military chocolate | Dark brownish gray | 10 R 3/1 | Dark Wood |
| Military charcoal | Dark greenish gray | 5 GY 3/1 | Charcoal |
| Marine blue gray | Brownish gray | 5 YR 5/1 | Gainsboro |
| Marine red gray | Dark brownish gray | 5 YR 4/1 | Peach Puff3 |
| Marine sane | Brownish gray | 10 R 5/1 | Antique White |
| Marine forest | Dark greenish brown | 2.5 GY 3/2 | Forest Green |
| Marine black | Dark greenish gray | 5 GY 3/1 | Black |
| Special force khaki gray | Greenish gray | 10 Y 5/1 | Khaki gray |
| Special force sand | Dark grayish brown | 2.5 Y 4/2 | Loess |
| Special force green | Dark grayish green | 10 GY 3/2 | Wood field |
| Special force black | Dark greenish gray | 5 GY 3/1 | Charcoal |
| Military green | Greenish black | 10 G 2/1 | Dark Green |
| Military gray | Brownish gray | 10 YR 5/1 | Yellowish Gray |

For example, the color of the fluid 131 is selected as the military beige gray, and a first particle 132a of the multiple particles 132 is selected as the military forest green, and a second particle 132b is selected as the military olive green, and thus total three colors may be selected. Alternatively, one of the military beige gray, the military forest green, the military olive green, the military chocolate, and the military charcoal or one of the colors of the table is selected as the color of the fluid 131, and four different colors are selected as the colors of the multiple particles 132, and thus a total five colors may be selected.

Since a camouflage pattern used to camouflage military equipment is configured using only a few colors rather than various colors, and using low-chroma colors, it is easy to accurately reproduce the camouflage pattern, compared to a combination of RGB colors. Also, since the color of the fluid 131 or the particle 132 is the camouflage color, the camouflage color is maintained even though the display device 100 is damaged.

Also, since the unit cell 130 display colors, a color filter may not be included. Thus, the process of combining the color filter and the material cost of the color filter may be omitted, whereby manufacturing cost can be saved.

Figure 6A:
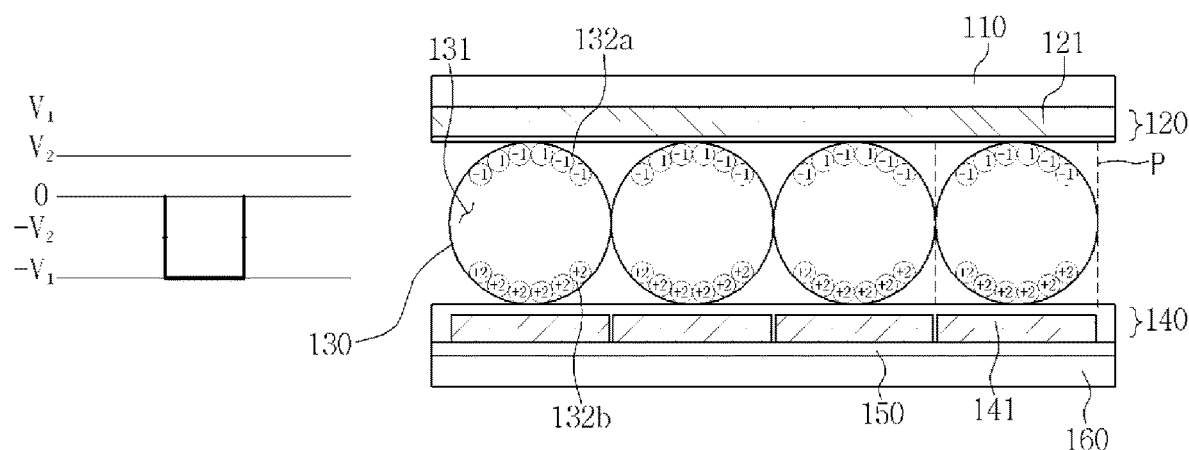
FIGS. 6A, 6B, and 6C are views illustrating an operation principle of controlling a unit cell containing particles having opposite polarities and different quantities of electric charge of FIG. 5A.
Figure 6B:
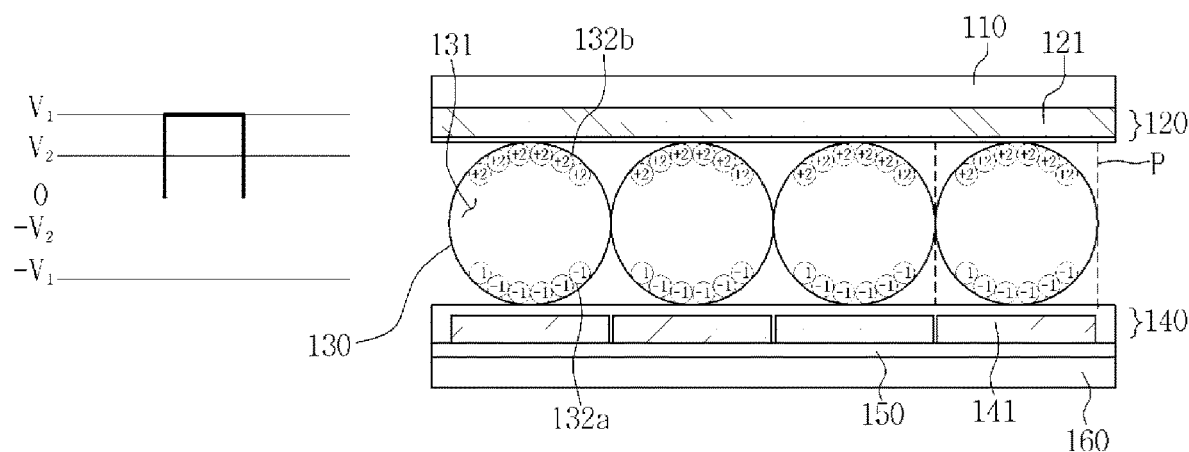
Figure 6C:
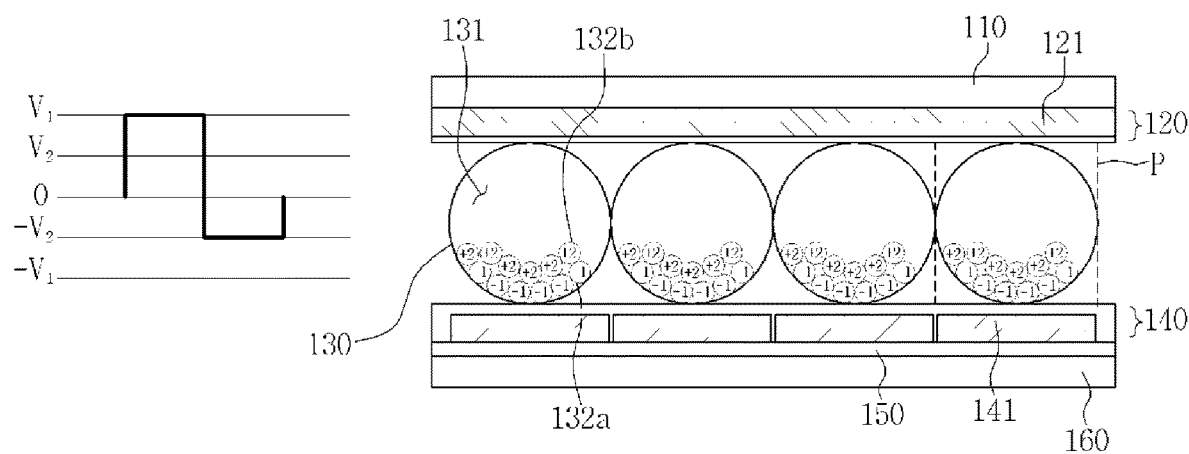

Hereinafter, an operation principle of controlling the unit cell 130 so as to control the color of the display device will be described with reference to FIGS. 6A, 6B, 6C, 7A, 7B, and 7C. FIGS. 6A to 6C are views illustrating an operation principle of controlling the unit cell containing particles having opposite polarities and different quantities of electric charge of FIG. 5A.

As shown in FIG. 5A, the unit cell 130 contains the fluid 131 that has a color and is electrically neutral and two types of particles 132a and 132b having different polarities and different quantities of electric charge. The particles 132a and 132b move within the unit cell 130 depending on the direction and strength of the electric field applied to the unit cell 130. As shown in FIG. 6A, the unit cell 130 is disposed between the upper electrode layer 120 and the lower electrode layer 140, and thus the movement of the particles 132 within the unit cell 130 is controlled according to the electric field generated by the upper electrode layer 120 and the lower electrode layer 140.

When the particles 132 move to the upper portion of the unit cell 130, light having entered the display device 100 from outside through the upper substrate 110 is reflected on the particles 132 positioned at the upper portion of the unit cell 130 and is shown to the outside as the color of the display device. The color of the display device is the color of the particles 132 positioned at the upper portion of the unit cell 130.

The strength and direction of the electric field applied to the unit cell 130 of the pixel area P can be adjusted by controlling the strength of the voltage applied to the upper electrode layer 120 and the lower electrode layer 140. Thus, the multiple particles 132 having different polarities and quantities of electric charge may be selectively moved. Consequently, the color shown at the upper portion of the unit cell 130 may be adjusted.

In order to control the unit cell 130 by the electric field generated by the upper electrode layer 120 and the lower electrode layer 140, the multiple particles 132 have negative or positive polarities and different values of the quantity of electric charge. For example, as shown in FIG. 5A, the particle 132a in a first color may have the quantity of electric charge of −1 C, and the particle 132b in a second color may have the quantity of electric charge of +2 C. Alternatively, when the particles 132 have four colors, the colors may have different quantities of electric charge (e.g., −1 C, +2 C, −3 C, and +4 C). In synthesis of the particles 132, polarities and quantities of electric charge of the particles 132 may be controlled depending on a charge control agent (CCA) content.

A process of controlling the unit cell 130 when the particles have different polarities and different quantities of electric charge shown in FIG. 5A will be described with reference to FIGS. 6A, 6B, and 6C as an example.

At the same electric field strength, the particle having a large quantity of electric charge receives greater power. Thus, the particle having a large quantity of electric charge moves even at the small electric field strength but the particle having a small quantity of electric charge does not move. When it is required to apply the voltage of at least $V_1$ to the lower electrode based on the upper electrode so as to move the particle 132a having the quantity of electric charge of 1 C and it is required to apply the voltage of at least $V_2$ to the lower electrode based on the upper electrode so as to move the particle 132a having the quantity of electric charge of 2 C, $V_1$ is larger than $V_2$. Accordingly, when a voltage equal to or greater than $V_1$ is applied, the particle 132a having the quantity of electric charge of 1 C and the particle 132b having the quantity of electric charge of 2 C move. When a voltage less than $V_1$ and equal to or greater than $V_2$ is applied, the particle 132a having the quantity of electric charge of 1 C does not move but the particle 132b having the quantity of electric charge of 2 C moves. The particle 132a having the negative polarity and the particle 132b having the positive polarity move in different directions depending on the direction of the electric field.

As shown in FIG. 6A, when applying a voltage that causes the lower electrode 141 to have a voltage lower than that of the upper electrode 121 by $V_1$ or more, the electric field is generated in a direction from the upper electrode 121 to the lower electrode 141. Thus, the first particle 132a having the quantity of electric charge of −1 C moves toward the upper electrode 121 and the second particle 132b having the quantity of electric charge of +2 C moves toward the lower electrode 141. The first particle 132a is positioned at the upper portion of the unit cell 130, such that the unit cell 130 is represented by the first color. The second particle 132b is positioned at the lower portion of the unit cell 130, such that the second particle 132b is invisible from the outside.

As shown in FIG. 6B, when applying a voltage that causes the lower electrode 141 to have a voltage higher than that of the upper electrode 121 by $V_1$ or more, the electric field is generated in a direction from the lower electrode 141 to the upper electrode 121. Thus, the first particle 132a having the quantity of electric charge of −1 C moves toward the lower electrode 141 and the second particle 132b having the quantity of electric charge of +2 C moves toward the upper electrode 121. The second particle 132b is positioned at the upper portion of the unit cell 130, such that the unit cell 130 is represented by the second color. The first particle 132a is positioned at the lower portion of the unit cell 130, such that the first particle 132a is invisible from the outside.

As shown in FIG. 6C, in the case where a voltage that causes the lower electrode 141 to have a voltage higher than that of the upper electrode 121 by $V_1$ or more is applied for a particular time such that, as shown in FIG. 6B, the first particle 132a having the quantity of electric charge of −1 C moves toward the lower electrode and the second particle 132b having the quantity of electric charge of +2 C moves toward the upper electrode, and then a voltage that causes the lower electrode 141 to have a voltage lower than that of the upper electrode 121 by less than $V_1$ and equal to or greater than $V_2$ is applied, only the second particle 132b having the quantity of electric charge of +2 C moves toward the lower electrode and the first particle 132a having the quantity of electric charge of −1 C does not move toward the upper electrode. Therefore, both the first particle 132a and the second particle 132b are positioned at the lower portion of the unit cell 130, and thus both particles are invisible from the outside. Only the fluid 131 exists at the upper portion of the unit cell 130, and thus the display device is represented by the color of the fluid 131.

As described above, by controlling the voltage applied to the upper electrode 121 and the lower electrode 141, movement of the particle 132 having different polarities and different quantities of electric charge may be adjusted and three colors may be displayed at one pixel area P. Based on the above description, the technical scope of the present invention includes that three or more types of particles having different quantities of electric charge and different polarities are used and four or more colors can be displayed by continuously applying different voltages.

As shown in FIG. 5B, the unit cell 130 contains the fluid 131 that has a color and is electrically neutral and two types of particles 132c and 132d having different polarities and different sizes. The particles 132c and 132d move within the unit cell 130 depending on the direction and strength of the electric field applied to the unit cell 130.

In order to control the unit cell 130 by the electric field generated by the upper electrode layer 120 and the lower electrode layer 140, the multiple particles 132 have negative or positive polarities and different sizes. For example, as shown in FIG. 5B, the particle 132c in the first color may have a negative polarity and a size of 400 nm, and the particle 132c in the second color may have a positive polarity and a size of 100 nm. Alternatively, when the particles 132 have four colors, the colors may have different sizes (e.g., 100 nm, 200 nm, 300 nm, and 400 nm). In synthesis of the particles 132, polarities of the particles 132 may be controlled depending on a charge control agent (CCA) content.

A process of controlling the unit cell 130 when the particles have different polarities and different sizes shown in FIG. 5B will be described with reference to FIGS. 7A, 7B, and 7C as an example.

At the same electric field strength, when the particles have the same quantity of electric charge, a small-sized particle may have small resistance. Thus, a small-sized particle moves even at the small electric field strength but a large-sized particle does not move. When it is required to apply the voltage of at least $V_1$ to the lower electrode based on the upper electrode so as to move the particle 132c having the size of 400 nm and it is required to apply the voltage of $V_2$ to the lower electrode based on the upper electrode so as to move the particle 132a having a size of 100 nm, $V_1$ is larger than $V_2$. Accordingly, when a voltage equal to or greater than $V_1$ is applied, the particle 132c having the size of 400 nm and the particle 132d having the size of 100 nm move. When a voltage less than $V_1$ and equal to or greater than $V_2$ is applied, the particle 132c having the size of 400 nm does not move but the particle 132d having the size of 100 nm moves. The particle 132c having the negative polarity and the particle 132d having the positive polarity move in different directions depending on the direction of the electric field.

Figure 7A:
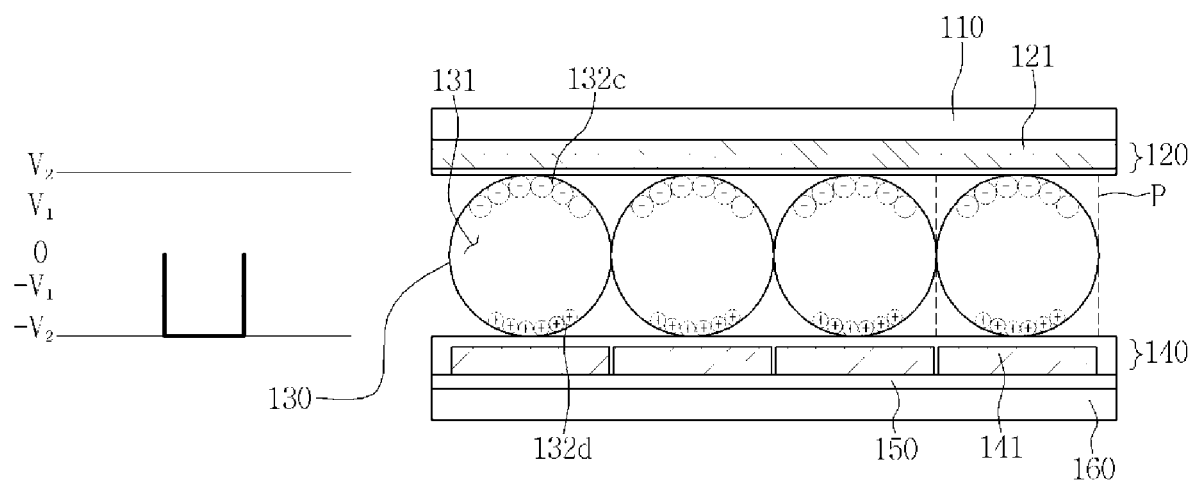
FIGS. 7A, 7B, and 7C are views illustrating an operation principle of controlling a unit cell containing particles having opposite polarities and different sizes of FIG. 5B.

As shown in FIG. 7A, when applying a voltage that causes the lower electrode 141 to have a voltage lower than that of the upper electrode 121 by $V_1$ or more, the electric field is generated in a direction from the upper electrode 121 to the lower electrode 141. Thus, a first particle 132c having the size of 400 nm and the negative polarity moves toward the upper electrode 121, and a second particle 132d having the size of 100 nm and the positive polarity moves toward the lower electrode 141. The first particle 132c is positioned at the upper portion of the unit cell 130, such that the unit cell 130 is represented by the first color. The second particle 132d is positioned at the lower portion of the unit cell 130, such that the second particle 132d is invisible from the outside.

Figure 7B:
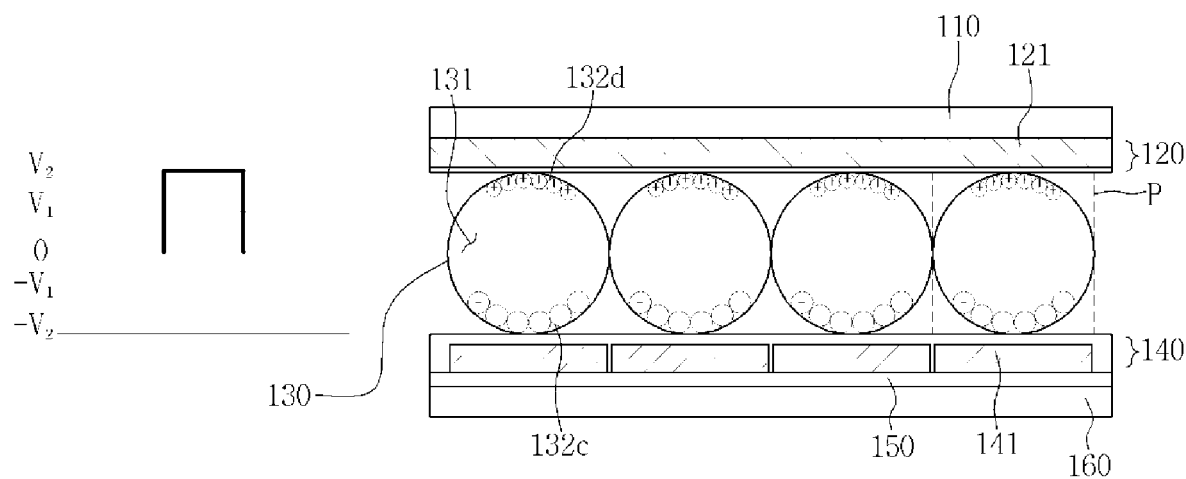

As shown in FIG. 7B, when applying a voltage that causes the lower electrode 141 to have a voltage higher than that of the upper electrode 121 by $V_1$ or more, the electric field is generated in a direction from the lower electrode 141 to the upper electrode 121. Thus, the first particle 132c having the size of 400 nm and the negative polarity moves toward the lower electrode 141, and the second particle 132d having the size of 100 nm and the positive polarity moves toward the upper electrode 121. The second particle 132d is positioned at the upper portion of the unit cell 130, such that the unit cell 130 is represented by the second color. The first particle 132c is positioned at the lower portion of the unit cell 130, such that the first particle 132c is invisible from the outside.

Figure 7C:
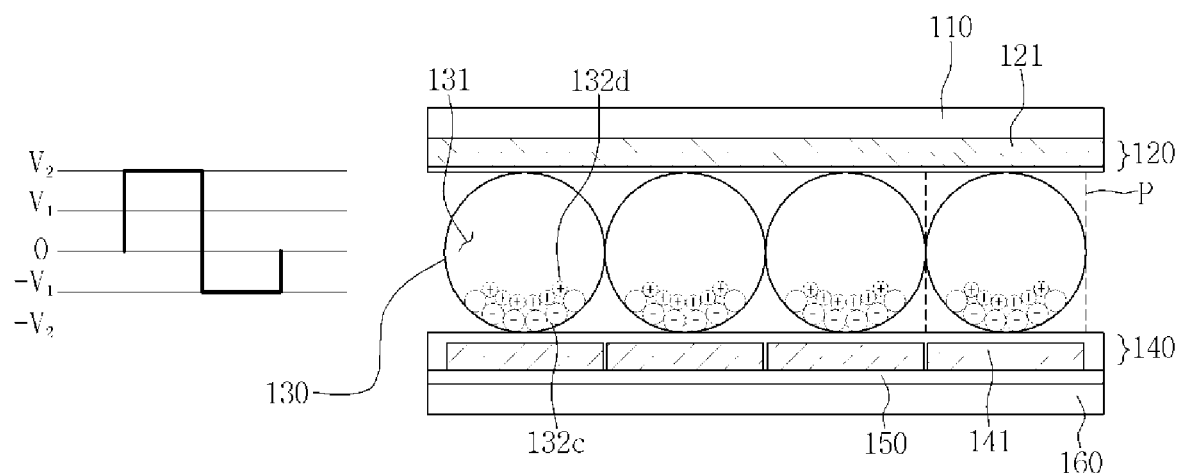

As shown in FIG. 7C, in the case where a voltage that causes the lower electrode 141 to have a voltage higher than that of the upper electrode 121 by $V_1$ or more is applied for a particular time such that, as shown in FIG. 7B, the first particle 132c having the size of 400 nm and the negative polarity moves toward the lower electrode and the second particle 132d having the size of 100 nm and the positive polarity moves toward the upper electrode, and then a voltage that causes the lower electrode 141 to have a voltage lower than that of the upper electrode 121 by less than $V_1$ and equal to or greater than $V_2$ is applied, only the second particle 132d having the size of 100 nm and the positive polarity moves toward the lower electrode and the first particle 132c having the size of 400 nm and the negative polarity does not move toward the upper electrode. Therefore, both the first particle 132c and the second particle 132d are positioned at the lower portion of the unit cell 130, and thus both particles are invisible from the outside. Only the fluid 131 exists at the upper portion of the unit cell 130, and thus the display device is represented by the color of the fluid 131.

As described above, by controlling the voltage applied to the upper electrode 121 and the lower electrode 141, movement of the particle 132 having different polarities and different sizes may be adjusted, and three colors may be displayed at one pixel area P. Based on the above description, the technical scope of the present invention includes that three or more types of particles having different polarities and different sizes are used and four or more colors can be displayed by continuously applying different voltages.

As described above, the particles 132 are selectively moved by adjusting the direction and strength of the electric field, whereby the color represented at the upper portion of the unit cell 130 can be selectively adjusted. As the color represented at the upper portion of the unit cell 130 is adjusted, it is difficult to observe the display device in the visible light band (wavelengths ranging 400 to 700 nm). In the embodiment of the present invention, the case where the multiple particles 132 are the first particle 132a and the second particle 132b has been described as a reference, but the present invention may be applied to the case where the multiple particles 132 have three or four colors.

Also, the particle 132 of the unit cell 130 contains a pigment reflecting or absorbing near-infrared rays, and the particle 132 containing the pigment reflecting or absorbing near-infrared rays moves to the upper or lower portion of the unit cell 130 by electric field, whereby the near-infrared reflectance of the unit cell observed from the outside can be adjusted. Near-infrared rays contain infrared rays having wavelengths ranging 700 to 1200 nm. The near-infrared reflectance of each unit cell 130 in the near-infrared region is adjusted to be similar to the near-infrared reflectance of objects in the surrounding environment, such that it is difficult to distinguish the display device 100 from the surrounding environment during observation with near-infrared observation equipment at the night time, whereby a camouflage effect can be obtained.

The fluid 131 or the multiple particles 132 in the unit cell 130 may contain a pigment reflecting or absorbing near-infrared rays.

The pigment reflecting near-infrared rays may be: FeCr of a block color; CoAl or CoCrAl of a blue color; CrMgZnAl, CoCrZnTi, or CoNiZnTi of a green color; MnSbTi, FeCrZnTi, FeZnTi, FeAlTi, FeZn, or FeZnCr or a brown color; CrSbTi or NiSbTi of a yellow color; or PBaSr of a violet color. Also, a vat pigment may be used.

Materials that may be applied to the particle 132 and reflect near-infrared rays include titanium oxide, silicon oxide, zinc oxide, copper(II) sulfate pentahydrate, nickel(II) sulfate hexahydrate, zinc sulfate heptahydrate, $CeO_2$, MgO, germanium, silicon, zinc sulfide, zinc selenide, magnesium fluoride, sapphire, arsenic trislfide, calcium fluoride, and barium fluoride.

As materials absorbing near-infrared rays, organic pigments, such as dimonium, polymethine, metal complex, squarium, cyanine types, etc., may be used. Mainly, near-infrared rays ranging 800 to 1100 nm may be effectively absorbed.

As inorganic materials absorbing near-infrared rays, oxides, nitrides, carbides, oxynitrides, sulfides of metals, such as Sn, Ti, Si, Zn, Zr, Fe, Al, Cr, Co, Ce, In, Ni, Ag, Cu, Pt, Nn, Ta, W, V, Mo, etc., may be used. Particularly, metal oxides, such as indium tin oxide (ITO), antimony tin oxide (ATO), $SnO_2$, $TiO_2$, $SiO_2$, $ZrO_2$, ZnO, $Fe_2O_3$, $Al_2O_3$, FeO, $Cr_2O_3$, $Co_2O_3$, $CeO_2$, $In_2O_3$, NiO, MnO, CuO, $WO_3$, etc. may be used. In order to enhance infrared absorption, an additive, such as cesium (Cs), etc., may be added to the metal oxides.

As an organic infrared absorber, an amine compound, such as phthalocyanine, napthalocyanine, anthraquinone, cyanine compound, squarylic compound, thiol-nickel complex compound, triallylmethane, naphthoquinone, anthraquinone, N,N,N',N'-tetrakis(p-di-n-butyl aminophenyl)-phenylenediamine perchlorate, phenylenediammonium chloride, phenylenediammonium hexafluoro antimonate, phenylenediammonium fluoroborate, phenylenediammonium fluoride, etc. may be used.

The pigment reflecting or absorbing near-infrared rays is contained in the particle 132. That is, the unit cell 130 may contain the first particle 132a containing the pigment absorbing near-infrared rays and the second particle 132b containing the pigment reflecting near-infrared rays. Also, the fluid 131 in a color may contain the pigment absorbing or reflecting near-infrared rays.

For example, the particle 132 in a block color having FeCr of a block color may reflect near-infrared rays, and the particle 132 in the military forest green color having cesium (Cs) may absorb near-infrared rays.

As shown in FIGS. 6A to 7C, the first particle 132a and the second particle 132b may move depending on the direction and strength of the electric field. When the first particle 132a contains the pigment absorbing near-infrared rays and the second particle 132b contains the pigment reflecting near-infrared rays, the near-infrared reflectance of the pixel areas (P) may be adjusted by controlling the particles 132 moving to the upper portion of the unit cell 130. Accordingly, the proportion and distribution of the pixel areas (P) reflecting near-infrared rays and pixel areas (P) absorbing near-infrared rays are determined to form an infrared camouflage pattern, and the near-infrared reflectance of the display device displaying the camouflage pattern may be adjusted.

The near-infrared reflectance of the display device 100 in the near-infrared region is adjusted to be similar to the near-infrared reflectance of objects in the surrounding environment, such that it is difficult to distinguish the display device 100 from the surrounding environment during observation with near-infrared observation equipment at night time, whereby a camouflage effect can be obtained.

Also, the upper substrate 110 may be formed of a material having transmittance of 80% or more in a wavelength range of 600 to 860 nm. Since the transmittance of the upper substrate 110 is high for the wavelength corresponding to a portion of the visible light region and a portion of the infrared region, the camouflage pattern displayed on the display device 100 may effectively function in a process in which visible light and near-infrared rays having entered the display device 100 from the outside are reflected on the unit cell 130 and radiate to the outside.

Figure 8:
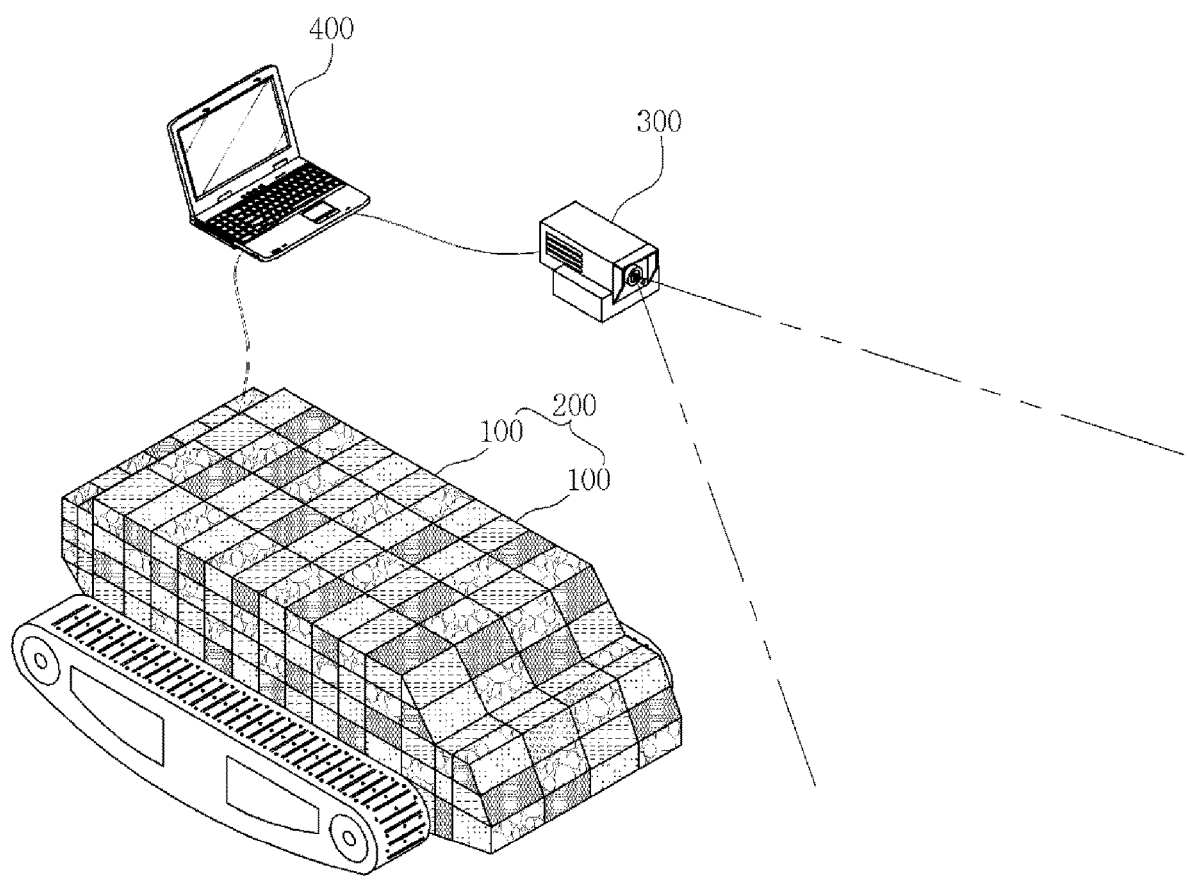
FIG. 8 is a view illustrating an active camouflage device according to an embodiment of the present invention.
Figure 9:
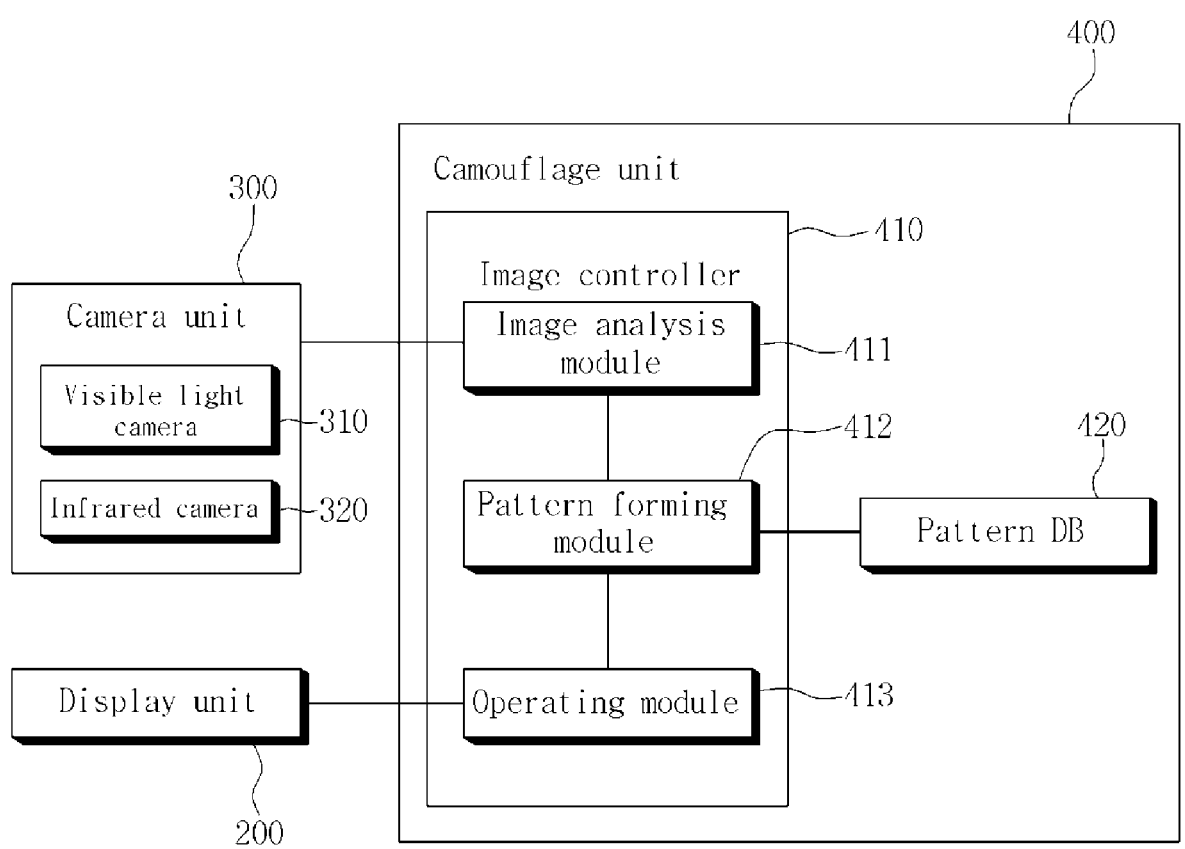
FIG. 9 is a view illustrating configurations of a camouflage unit of FIG. 8.

Hereinafter, an active camouflage device according to an embodiment of the present invention will be described with reference to the accompanying drawings. FIG. 8 is a view illustrating an active camouflage device according to an embodiment of the present invention. FIG. 9 is a view illustrating configurations of a camouflage unit 400 of FIG. 8. Description of the reflective display device 100 for visible light and infrared camouflage will be omitted.

An active camouflage device according to an embodiment of the present invention includes: a display unit 200 composed of multiple reflective display devices 100 for visible light and infrared camouflage, the display unit surrounding the exterior of a combat vehicle; a camera unit 300 photographing a surrounding environment of the combat vehicle in every direction to obtain a visible light image and an infrared image; and an image controller 410 forming a visible light camouflage pattern based on the visible light image or an infrared camouflage pattern based on the infrared image so as to display the formed pattern on the display unit 200.

Accordingly, the active camouflage device forms the visible light or infrared camouflage pattern in real time depending on the surrounding environment and displays the pattern on the exterior of the combat vehicle. The camouflage pattern is actively changed depending on the surrounding environment that differ in consequence of the movement of the combat vehicle or the passage of time, such that the combat vehicle can be concealed from the enemy.

The display unit 200 composed of multiple reflective display devices 100 surrounds the exterior of the combat vehicle. As described above, the reflective display device 100 is formed of a flexible material, and the display unit may cover the combat vehicle as a thin film. However, a mounting relation between the display unit 200 and the combat vehicle is not limited thereto, and the reflective display device 100 may be formed as a panel and attached on the exterior of the combat vehicle as shown in FIG. 8.

In the meantime, the display unit 200 may display the camouflage pattern in a mosaic pattern by changing the color in units of the reflective display device 100. Alternatively, the display unit 200 may display the camouflage pattern in various shapes, such as blotches, by changing the color in units of the pixel area (P) of the reflective display device 100. The display unit 200 may cover the whole combat vehicle except for the bottom thereof or except for some portions, such as the wheels, etc., in some cases.

The camera unit 300 photographs the surrounding environment of the combat vehicle in every direction, and provides the obtained image to an image analysis module 411 of the image controller 410. The camera unit 300 includes a visible light camera 310 and an infrared camera 320. The visible light camera 310 obtains a visible light image showing representative colors and distributions, etc. of the surrounding environment, and the infrared camera 320 obtains an infrared image showing infrared reflectance of the surrounding environment.

The camera unit 300 may be provided as a plurality of cameras to photograph the surrounding environment in every direction, or may be provided in a rotatable structure to obtain images in every direction. It is desirable that the camera unit 300 is attached on the combat vehicle to photograph the surrounding environment in consequence of movement of the combat vehicle. However, even though the camera unit is attached to a separate place, it is within the scope of the present invention. In the present invention, it is unnecessary for the visible light camera 310 to obtain an image with high resolution and accuracy, but with a level where it is sufficient to recognize the surrounding colors to determine the camouflage pattern.

The image controller 410 analyses the image obtained by the camera unit 300, forms a camouflage pattern hidden in the surrounding environment, and provides the formed camouflage pattern to the display unit 200. The image controller 410 may be provided in the combat vehicle and connected to the camera unit 300 or the display unit 200 through wired or wireless connection. Alternatively, the image controller 410 may be provided outside of the combat vehicle and remotely control the camera unit 300 or the display unit 200 through a wireless connection. A camouflage unit 400 is composed of the image controller 410 and a pattern database 420 described later.

The image controller 410 may include an image analysis module 411, a pattern forming module 412, and an operating module 413.

The image analysis module 411 analyses the visible light image to extract a plurality of representative colors, analyses distributions, and analyses the infrared image to calculate the infrared reflectance. In analyzing of the visible light image, the number of the representative colors is three to five in order to form the camouflage pattern in a short time, and the distributions analyzed for each of the extracted representative colors may be provided in coordinates as being simplified by point units. The image analysis module 411 may obtain the infrared reflectance of the surrounding environment by analyzing the infrared image.

The pattern forming module 412 forms, based on the representative colors and distributions, a visible light camouflage pattern to be displayed on the display unit 200, and forms, based on the infrared reflectance, an infrared camouflage pattern to be displayed on the display unit 200. The visible light camouflage pattern may be formed in real time based on the distributions of the representative colors simplified by point units in consideration of the proportion for each of the representative colors. The near-infrared camouflage pattern may be formed, based on the infrared reflectance analyzed by the image analysis module 411, by determining the distributions of the pixel areas (P) reflecting near-infrared rays and of the pixel areas (P) absorbing near-infrared rays in real time.

The camouflage unit 400 may further include a pattern database 420 storing preset visible light camouflage patterns and preset infrared camouflage patterns. The pattern forming module 412 may compare the representative colors, distributions, and infrared reflectance with the camouflage patterns stored in the pattern database 420 to select a similar camouflage pattern.

In forming the camouflage pattern, camouflage patterns of the pattern database 420 storing a number of frequently-used visible lights or infrared camouflage patterns are compared with the surrounding environment (representative colors, distributions, and near-infrared reflectance), and the most similar camouflage pattern is selected, whereby the camouflage pattern can be formed. In this case, calculation is simple such that the camouflage pattern can be formed in a short time.

Also, in the daytime, camouflage of a visible light region is prioritized, and thus only the visible light camouflage pattern is formed based on the representative colors and distributions of the surrounding environment. At the night time, camouflage of near-infrared region is prioritized, and thus only the near-infrared camouflage pattern is formed based on the near-infrared reflectance of the surrounding environment.

Also, when forming the camouflage pattern by selecting one of the visible light and near-infrared regions, the combat vehicle may be detected by observation equipment in the unselected region. Thus, in order to satisfy camouflage in both the visible light region and near-infrared region, the camouflage pattern may be formed in consideration of the representative colors, distributions, and near-infrared reflectance.

The operating module 413 controls the display unit 200 to enable the visible light camouflage pattern or infrared camouflage pattern formed by the pattern forming module 412 to be displayed on the display unit 200. The operating module 413 provides signals driving specific pixel areas (P) to the display unit 200 so as to enable the camouflage pattern received from the pattern forming module 412 to be displayed on the display unit 200.

The active camouflage device according to the embodiment of the present invention can analyze the surrounding environment of the visible light region and infrared region, and can form and display the visible light or infrared camouflage pattern based on the surrounding environment using the reflective display device 100 for visible light and infrared camouflage in real time, whereby the combat vehicle can be adapted to the surrounding environment in real time and effective camouflage is ensured.

Although the present invention has been described in detail with reference to specific embodiments, those embodiments are provided only for illustrative purposes. Therefore, the present invention is not limited to those embodiments, but rather those skilled in the art will appreciate that various modifications, additions and substitutions are possible, without departing from the scope and spirit of the present invention as disclosed in the accompanying claims.

Further, simple changes and modifications of the present invention are appreciated as included in the scope and spirit of the present invention, and the protection scope of the present invention will be defined by the accompanying claims.

What is claimed is:

1. A reflective display device for visible light and infrared camouflage, the reflective display device comprising:
   an upper substrate formed of a transparent material;
   an upper electrode layer formed of a transparent material provided under a lower surface of the upper substrate;
   at least one unit cell provided under a lower surface of the upper electrode layer, the unit cell containing a fluid and multiple particles being charged with opposite polarities and having different quantities of electric charge or different sizes;
   a lower electrode layer provided under the unit cell, the lower electrode layer for generating an electric field in conjunction with the upper electrode layer to control the unit cell included in a pixel area;
   a shielding layer provided under a lower surface of the lower electrode layer, the shielding layer blocking thermal-infrared rays; and
   a lower substrate provided under a lower surface of the shielding layer,
   wherein the unit cell includes:
      a first particle having a first camouflage color and a pigment absorbing near-infrared rays; and
      a second particle having a second camouflage color different from the first camouflage color and a pigment reflecting near-infrared rays,
   wherein the multiple particles is moved to an upper portion or a lower portion of the unit cell by the electric field, such that a color represented at the upper portion of the unit cell is adjusted to display a visible light camouflage pattern, and
   wherein the multiple particles is moved to the upper portion or the lower portion of the unit cell by the electric field, such a near-infrared reflectance of the unit cell observed from outside is adjusted to display an infrared camouflage pattern determined by a proportion and distribution of pixel areas reflecting near-infrared rays and pixel areas absorbing near-infrared rays.

2. The reflective display device of claim 1, wherein the upper electrode layer includes a plurality of upper electrodes arranged parallel to each other in a first direction,
   the lower electrode layer includes a plurality of lower electrodes arranged parallel to each other in a second direction perpendicular to the first direction, and
   the upper electrode layer and the lower electrode layer control the pixel area in a passive matrix (PM) manner.

3. The reflective display device of claim 1, wherein the lower electrode layer includes a thin film transistor for controlling each pixel area, and
   the upper electrode layer and the lower electrode layer control the pixel area in an active matrix (AM) manner.

4. The reflective display device of claim 1, wherein the lower electrode layer includes lower electrodes positioned at each pixel area, and each of the lower electrodes controls the pixel area in a segment manner.

5. The reflective display device of claim 1, wherein the shielding layer contains at least one of platinum (Pt), gold (Au), silver (Ag), aluminium (Al), iron (Fe), copper (Cu), tin oxide, indium tin oxide (ITO), antimony tin oxide (ATO), $Al_2O_3$, ZnO, $TiO_2$, and indium gallium zinc oxide (IGZO) that block thermal-infrared rays.

6. The reflective display device of claim 1, wherein the fluid and the multiple particles are provided in at least two colors selected from a group of military beige gray, military forest green, military olive green, military chocolate, and military charcoal.

7. The reflective display device of claim 1, wherein the upper substrate is formed of a material having transmittance of 80% or more in a wavelength range of 600 to 860 nm.

8. An active camouflage device comprising:
   a display unit composed of multiple reflective display devices for visible light and infrared camouflage of claim 1, the display unit surrounding an exterior of a combat vehicle;
   a camera unit photographing a surrounding environment of the combat vehicle in every direction to obtain a visible light image and an infrared image; and
   an image controller forming a visible light camouflage pattern based on the visible light image or an infrared camouflage pattern based on the infrared image so as to display the formed pattern on the display unit.

9. The active camouflage device of claim 8, wherein the image controller includes:
   an image analysis module analyzing the visible light image to extract a plurality of representative colors, analyzing distributions, and analyzing the infrared image to calculate infrared reflectance;
   a pattern forming module, based on the representative colors and the distribution, forming the visible light camouflage pattern to be displayed on the display unit and, based on the infrared reflectance, forming the infrared camouflage pattern to be displayed on the display unit; and
   an operating module controlling the display unit to enable the visible light camouflage pattern or the infrared camouflage pattern formed by the pattern forming module to be displayed on the display unit.

10. The active camouflage device of claim 9, further comprising:
    a pattern database storing preset visible light camouflage patterns and preset infrared camouflage patterns,
    wherein the pattern forming module compares the representative colors, the distributions, and the infrared reflectance with the preset patterns stored in the pattern database to select a similar camouflage pattern.

* * * * *